(12) United States Patent
Dry

(10) Patent No.: US 8,844,559 B1
(45) Date of Patent: Sep. 30, 2014

(54) CLEANOUT PROTECTOR

(71) Applicant: Michael Dry, Justin, TX (US)

(72) Inventor: Michael Dry, Justin, TX (US)

(*) Notice: Subject to any disclaimer, the term of this patent is extended or adjusted under 35 U.S.C. 154(b) by 0 days.

(21) Appl. No.: 13/663,597

(22) Filed: Oct. 30, 2012

Related U.S. Application Data

(60) Provisional application No. 61/562,535, filed on Nov. 22, 2011.

(51) Int. Cl.
  *E03B 1/00* (2006.01)
  *F16L 53/00* (2006.01)

(52) U.S. Cl.
  USPC .......................................... 137/377; 137/363

(58) Field of Classification Search
  USPC ................. 137/377–382, 356–372; 138/96 R
  See application file for complete search history.

(56) References Cited

U.S. PATENT DOCUMENTS

| 1,800,840 | A | * | 4/1931 | Lewin | 285/119 |
| 3,506,296 | A | * | 4/1970 | Nelson | 111/101 |
| 5,769,565 | A | * | 6/1998 | Martin et al. | 404/25 |

* cited by examiner

*Primary Examiner* — John Rivell
*Assistant Examiner* — Kevin E Lynn
(74) *Attorney, Agent, or Firm* — Kenneth L Tolar

(57) ABSTRACT

A cleanout protector includes a hollow sleeve having an upper end, a lower end and at least one outer wall. The lower end includes a plurality of piercing members for penetrating surrounding soil. Any one of a plurality of fixtures, such as a solar lamp or a decorative design element, is removably mounted on the upper end of the sleeve. Accordingly, a user superimposes the sleeve on a cleanout and inserts the piercing members into the soil as far as possible. A desired fixture is mounted on the sleeve thereby protecting and decoratively concealing the cleanout.

11 Claims, 2 Drawing Sheets

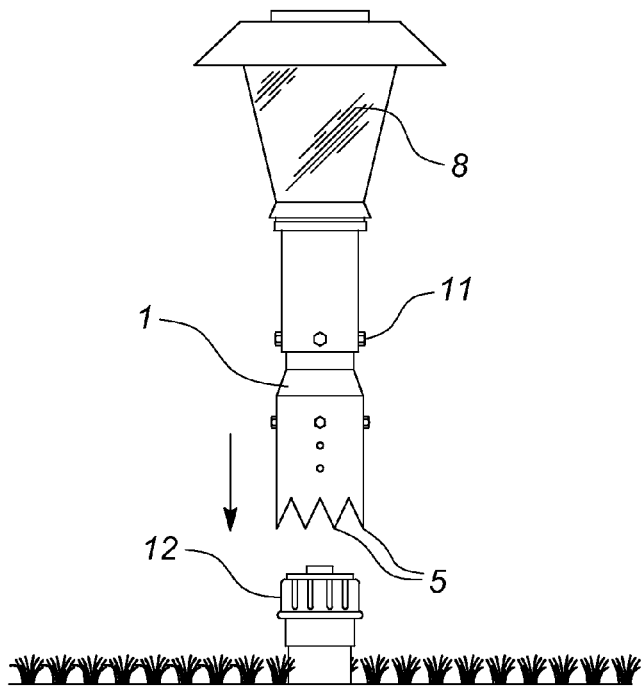
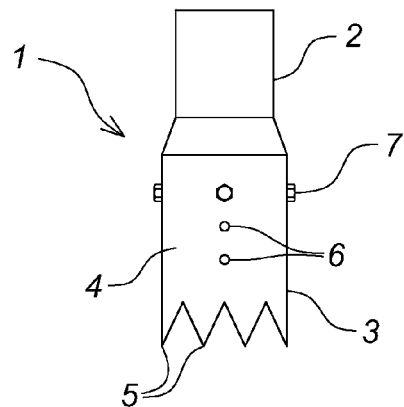
Fig. 1
Fig. 2
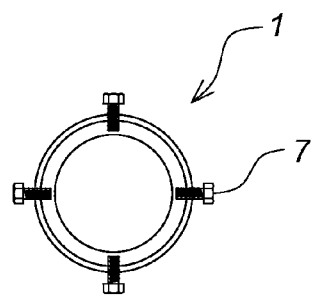
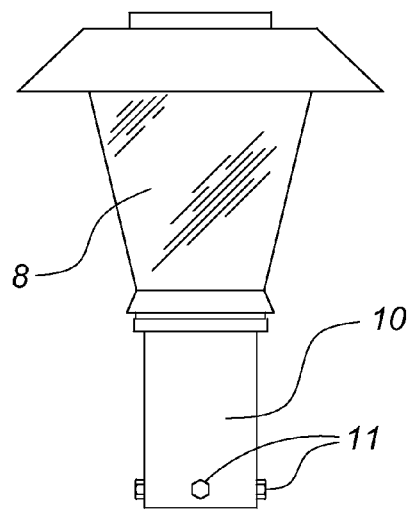
Fig. 3
Fig. 4

CLEANOUT PROTECTOR

CROSS REFERENCE TO RELATED APPLICATIONS

This application is entitled to the benefit of provisional application No. 61/562,535 filed on Nov. 22, 2011, the specification of which is hereby incorporated by reference.

BACKGROUND OF THE INVENTION

The present invention relates to a device for protecting and aesthetically concealing a plumbing cleanout.

DESCRIPTION OF THE PRIOR ART

A cleanout is an integral part of a plumbing system that allows a plumber to more easily access and remove debris and other obstructions. The cleanout is typically placed at a location where debris is most likely to accumulate; the cleanout usually includes a vertical pipe positioned outside of a building that, according to conventional plumbing standards, must be at least two inches above the ground. However, the low-profile, protruding pipe is easily struck by lawnmowers, weed trimmers and other garden tools. Repairing or replacing the cleanout often requires costly excavation that destroys surrounding landscaping. Furthermore, the cleanout is unsightly unless concealed by shrubs or other vegetation.

Accordingly, there is currently a need for a device that protects and conceals plumbing cleanouts. The present invention addresses this need by providing a decorative sleeve that is superimposed on a cleanout to prevent damage thereto.

SUMMARY OF THE INVENTION

The present invention relates to a cleanout protector comprising a hollow sleeve having an upper end, a lower end and at least one outer wall. The lower end includes a plurality of piercing members for penetrating surrounding soil. Any one of a plurality of fixtures, such as a solar lamp or a decorative design element, is removably mounted on the upper end of the sleeve. Accordingly, a user superimposes the sleeve on a cleanout and inserts the piercing members into the surrounding soil as far as possible. A desired fixture is mounted on the sleeve thereby protecting and decoratively concealing the cleanout.

It is therefore an object of the present invention to provide a device that prevents costly damage to a plumbing cleanout.

It is another object of the present invention to provide a protector that decoratively conceals a plumbing cleanout.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is an exploded, plan view of a cleanout and the protector according to the present invention.

FIG. 2 is an isolated, plan view of the sleeve.

FIG. 3 is a top, plan view of the sleeve.

FIG. 4 is an isolated view of an exemplary fixture.

DESCRIPTION OF THE PREFERRED EMBODIMENT

Figure 5:
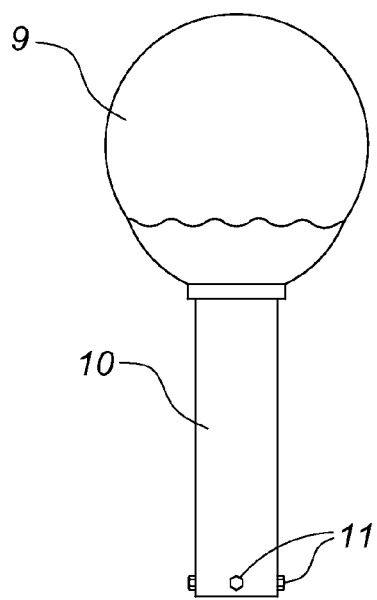
FIG. 5 is an isolated view of a different type of fixture than that depicted in FIG. 4.

The present invention relates to a cleanout protector comprising a hollow sleeve 1 having a narrow upper portion 2, a wide lower portion 3 and at least one outer wall 4. The lower portion is dimensioned to receive a cleanout 12 and includes a plurality of piercing members 5 on a bottom edge for penetrating surrounding soil. The outer wall includes a plurality of peripherally-positioned apertures 6, each having a threaded fastener 7 therein to clamp the sleeve to the outer surface of the cleanout 12.

Any one of a plurality of fixtures, such as a solar lamp 8 or a design element 9, is attachable to the sleeve to aesthetically enhance the protector. The fixture includes a mounting post 10 that firmly receives the narrow, upper portion of the sleeve. Releasable, threaded fasteners 11 grip the sleeve exterior to anchor the fixture thereto.

Figure 6:
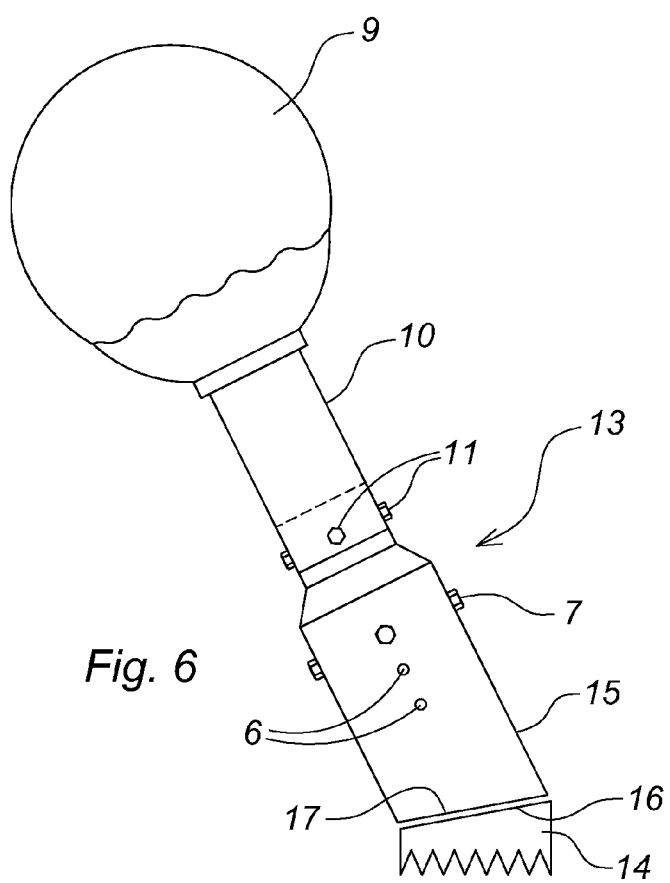
FIG. 6 depicts a slightly different embodiment of the present invention.

Now referring specifically to FIG. 6, another embodiment 13 includes an angle-adjustment mechanism for concealing oblique cleanouts. The sleeve is formed of a base section 14 and a rotating upper section 15 similar to that of an adjustable wind turbine. The base section 14 includes a chamfered upper edge 16 that mates with a chamfered lower edge 17 on the upper section 15. By rotating the upper section, a user can vary the angle thereof to correspond with that of the cleanout.

Accordingly, to protect and conceal a cleanout, a user superimposes the sleeve thereon and inserts the piercing members into the ground as far as possible. The fasteners 7 are tightened and a desired fixture is mounted on the sleeve thereby protecting and decoratively concealing the cleanout.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a plumbing cleanout having an exposed, protruding portion extending above underlying terrain, a protector comprising:
    a hollow sleeve superimposed on said protruding portion, said sleeve having a bottom edge, a lower portion, an upper portion and an exterior;
    means for anchoring said sleeve to the underlying terrain.

2. The protector according to claim 1 wherein said means for anchoring said sleeve to the underlying terrain comprises a plurality of piercing members on the bottom edge of said sleeve that penetrate the underlying terrain.

3. The protector according to claim 2 further comprising a means for securing said sleeve to said protruding portion.

4. The protector according to claim 3 wherein said means for securing said sleeve to said cleanout protruding portion:
    a plurality of threaded apertures positioned on the exterior of said sleeve;
    threaded fasteners received within said apertures that are tightened against said protruding portion.

5. The protector according to claim 2 further comprising a fixture attachable to said sleeve to aesthetically conceal said protruding portion.

6. The protector according to claim 5 wherein said fixture includes a mounting post that firmly receives the upper portion of said sleeve.

7. The protector according to claim 6 wherein the mounting post includes releasable, threaded fasteners that grip the exterior of said sleeve to anchor the fixture thereto.

8. The protector according to claim 1 wherein said sleeve is formed of a pair of independently, angularly-adjustable sections for enclosing an oblique protruding portion.

9. The protector according to claim 8 wherein said sleeve is formed of a base section and a rotating upper section, said base section having a chamfered upper edge, said upper section having a chamfered lower edge that mates with the upper edge of said base section, as said upper section is rotated, said sleeve moves between linear and non-linear configurations.

10. The protector according to claim 5 wherein said fixture is a lamp.

11. The protector according to claim 5 wherein said fixture is a design element.

* * * * *